United States Patent
Pandya et al.

(10) Patent No.: US 9,524,156 B2
(45) Date of Patent: Dec. 20, 2016

(54) FLEXIBLE FEATURE DEPLOYMENT STRATEGY

(71) Applicant: Ford Global Technologies, LLC, Dearborn, MI (US)

(72) Inventors: Ritesh Pandya, Rochester Hills, MI (US); Brian Petersen, Beverly Hills, MI (US); Joseph Paul Rork, Plymouth, MI (US); Praveen Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 14/151,516

(22) Filed: Jan. 9, 2014

(65) Prior Publication Data
US 2015/0193219 A1 Jul. 9, 2015

(51) Int. Cl.
*G06F 9/44* (2006.01)
*G06F 9/445* (2006.01)
*H04L 29/08* (2006.01)

(52) U.S. Cl.
CPC .............. *G06F 8/65* (2013.01); *H04L 67/125* (2013.01); *H04L 67/34* (2013.01)

(58) Field of Classification Search
CPC .................. G06F 8/65–8/71; G05D 1/00–1/12; G05D 3/00–3/206; G07C 5/008
USPC ................................ 717/168–178; 701/1–541
See application file for complete search history.

(56) References Cited

U.S. PATENT DOCUMENTS

| | | | |
|---|---|---|---|
| 5,155,847 A | 10/1992 | Kirouac et al. | |
| 6,035,423 A | 3/2000 | Hodges | |
| 6,359,570 B1* | 3/2002 | Adcox et al. | 340/902 |
| 6,694,248 B2* | 2/2004 | Smith et al. | 701/117 |
| 6,704,564 B1* | 3/2004 | Lange | H04L 29/06 340/7.2 |
| 6,853,910 B1* | 2/2005 | Oesterling et al. | 701/517 |
| 7,055,149 B2 | 5/2006 | Birkholz et al. | |
| 7,092,803 B2 | 8/2006 | Kapolka et al. | |
| 7,155,321 B2* | 12/2006 | Bromley | G07C 5/0808 340/989 |

(Continued)

OTHER PUBLICATIONS

A Model for Safe and Secure Execution of Downloaded Vehicle Applications Phu H. Phung—Department of Computer Science and Engineering Chalmers University of Technology, Sweden; Dennis Kengo Nilsson-Syncron Japan;Road Transport Information and Control Conference and the ITS United Kingdom Members' Conference—May 25-27, 2010.*

(Continued)

*Primary Examiner* — Francisco Aponte
(74) *Attorney, Agent, or Firm* — Jennifer M. Stec; Brooks Kushman P.C.

(57) ABSTRACT

A vehicle may gather vehicle build configuration information, and provide a vehicle identifier and the vehicle information to a server. The server may determine a feature set configuration of a configurable module of the vehicle based on the vehicle information and vehicle feature associations retrieved from a vehicle data source, and provide, in a message topic of a topic tree associated with the vehicle identifier to which the vehicle is subscribed, a notification to configure the configurable module. The vehicle may update a feature set configuration of a configurable module supporting a plurality of features based on the notification.

29 Claims, 3 Drawing Sheets

(56) References Cited

U.S. PATENT DOCUMENTS

| | | | |
|---|---|---|---|
| 7,171,661 B1 | 1/2007 | Pinera et al. | |
| 7,209,859 B2 | 4/2007 | Zeif | |
| 7,366,589 B2* | 4/2008 | Habermas | G06F 8/65 701/1 |
| 7,506,309 B2* | 3/2009 | Schaefer | 717/120 |
| 7,512,941 B2* | 3/2009 | Pan | G06F 17/30575 707/999.201 |
| 7,672,756 B2 | 3/2010 | Breed | |
| 7,822,775 B2 | 10/2010 | Langer | |
| 7,886,180 B2 | 2/2011 | Jin et al. | |
| 7,904,569 B1 | 3/2011 | Gelvin et al. | |
| 7,937,075 B2* | 5/2011 | Zellner | 455/418 |
| 8,326,486 B2 | 12/2012 | Moinzadeh et al. | |
| 8,370,254 B1 | 2/2013 | Hopkins, III et al. | |
| 8,416,067 B2* | 4/2013 | Davidson et al. | 340/426.1 |
| 8,427,979 B1 | 4/2013 | Wang | |
| 8,452,465 B1 | 5/2013 | Sinha et al. | |
| 8,458,315 B2 | 6/2013 | Miche et al. | |
| 8,473,938 B1 | 6/2013 | Feeser | |
| 8,494,449 B2* | 7/2013 | Witkowski et al. | 455/41.3 |
| 8,498,771 B2 | 7/2013 | Dwan et al. | |
| 8,521,424 B2* | 8/2013 | Schunder | G01C 21/26 701/452 |
| 8,561,054 B2* | 10/2013 | Smirnov | G06F 8/64 717/120 |
| 8,918,231 B2* | 12/2014 | Rovik | 701/2 |
| 9,075,686 B2* | 7/2015 | Alrabady | G06F 8/65 |
| 9,201,844 B2* | 12/2015 | Guenkova-Luy | H04L 41/069 |
| 2002/0120394 A1* | 8/2002 | Rayne | G01S 1/045 701/408 |
| 2002/0150050 A1 | 10/2002 | Nathanson | |
| 2002/0165962 A1 | 11/2002 | Alvarez et al. | |
| 2004/0010358 A1 | 1/2004 | Oesterling et al. | |
| 2004/0034624 A1 | 2/2004 | Deh-Lee et al. | |
| 2004/0064385 A1 | 4/2004 | Tamaki | |
| 2004/0117851 A1 | 6/2004 | Karaoguz et al. | |
| 2004/0168169 A1 | 8/2004 | Ebro et al. | |
| 2005/0010458 A1 | 1/2005 | Holloway et al. | |
| 2005/0055687 A1 | 3/2005 | Mayer | |
| 2005/0090941 A1 | 4/2005 | Stefan et al. | |
| 2005/0125261 A1* | 6/2005 | Adegan | 705/4 |
| 2005/0144616 A1 | 6/2005 | Hammond et al. | |
| 2005/0187668 A1 | 8/2005 | Baumgarte | |
| 2005/0187682 A1 | 8/2005 | Gault et al. | |
| 2005/0203673 A1* | 9/2005 | El-Hajj | G07C 5/008 701/1 |
| 2005/0216902 A1* | 9/2005 | Schaefer | 717/168 |
| 2005/0256614 A1 | 11/2005 | Habermas | |
| 2005/0262499 A1 | 11/2005 | Read | |
| 2006/0047381 A1 | 3/2006 | Nguyen | |
| 2006/0047415 A1 | 3/2006 | Groskreutz et al. | |
| 2006/0047666 A1 | 3/2006 | Bedi et al. | |
| 2006/0141997 A1 | 6/2006 | Amiens | |
| 2006/0142913 A1* | 6/2006 | Coffee | B28C 5/422 701/29.3 |
| 2006/0155439 A1* | 7/2006 | Slawinski et al. | 701/35 |
| 2006/0258377 A1* | 11/2006 | Economos et al. | 455/461 |
| 2008/0102854 A1 | 5/2008 | Yi et al. | |
| 2008/0140278 A1* | 6/2008 | Breed | 701/29 |
| 2009/0064123 A1 | 3/2009 | Ramesh et al. | |
| 2009/0088141 A1 | 4/2009 | Suurmeyer et al. | |
| 2009/0088924 A1* | 4/2009 | Coffee | B28C 5/422 701/31.4 |
| 2009/0119657 A1* | 5/2009 | Link, II | G06F 8/65 717/171 |
| 2009/0125897 A1 | 5/2009 | Matlin et al. | |
| 2009/0182825 A1 | 7/2009 | Fletcher | |
| 2010/0082559 A1 | 4/2010 | Sumcad et al. | |
| 2010/0228404 A1* | 9/2010 | Link et al. | 701/1 |
| 2010/0235433 A1 | 9/2010 | Ansari et al. | |
| 2010/0241722 A1 | 9/2010 | Seminaro et al. | |
| 2011/0045842 A1 | 2/2011 | Rork et al. | |
| 2011/0083128 A1* | 4/2011 | Hoch | G06F 8/61 717/174 |
| 2011/0105029 A1 | 5/2011 | Takayashiki et al. | |
| 2011/0106375 A1* | 5/2011 | Gurusamy Sundaram | 701/33 |
| 2011/0112969 A1* | 5/2011 | Zaid et al. | 705/50 |
| 2011/0137490 A1 | 6/2011 | Bosch et al. | |
| 2011/0306329 A1* | 12/2011 | Das | 455/416 |
| 2011/0307933 A1 | 12/2011 | Gavita et al. | |
| 2012/0079149 A1 | 3/2012 | Gelvin et al. | |
| 2012/0094643 A1 | 4/2012 | Brisebois et al. | |
| 2012/0142367 A1* | 6/2012 | Przybylski | 455/456.1 |
| 2012/0245786 A1 | 9/2012 | Fedorchuk et al. | |
| 2012/0253861 A1* | 10/2012 | Davidson | G06Q 10/08 705/7.11 |
| 2012/0330723 A1 | 12/2012 | Hedy | |
| 2013/0031540 A1* | 1/2013 | Throop | G06F 8/665 717/173 |
| 2013/0130665 A1 | 5/2013 | Peirce et al. | |
| 2013/0204455 A1* | 8/2013 | Chia et al. | 701/1 |
| 2013/0204466 A1 | 8/2013 | Ricci | |
| 2013/0226393 A1 | 8/2013 | Julson et al. | |
| 2014/0100737 A1* | 4/2014 | Haap | G06F 11/2294 701/31.4 |
| 2014/0282467 A1* | 9/2014 | Mueller | G06F 8/665 717/170 |
| 2014/0324275 A1 | 10/2014 | Stanek et al. | |
| 2014/0380296 A1* | 12/2014 | Pal | G06F 8/65 717/171 |
| 2015/0003456 A1 | 1/2015 | Seo et al. | |
| 2015/0046080 A1* | 2/2015 | Wesselius et al. | 701/428 |
| 2015/0058946 A1* | 2/2015 | Salamon et al. | 726/7 |
| 2015/0128123 A1* | 5/2015 | Eling | G06F 8/67 717/171 |
| 2015/0169311 A1* | 6/2015 | Dickerson | G06F 8/65 717/170 |
| 2015/0309784 A1* | 10/2015 | Molin | G06F 8/65 701/71 |

OTHER PUBLICATIONS

Vehicle Telematics: A Literature Review Ian Cassias, Andrew L. Kun—Technical Report ECE.P54.2007.9 Oct. 30, 2007.*

* cited by examiner

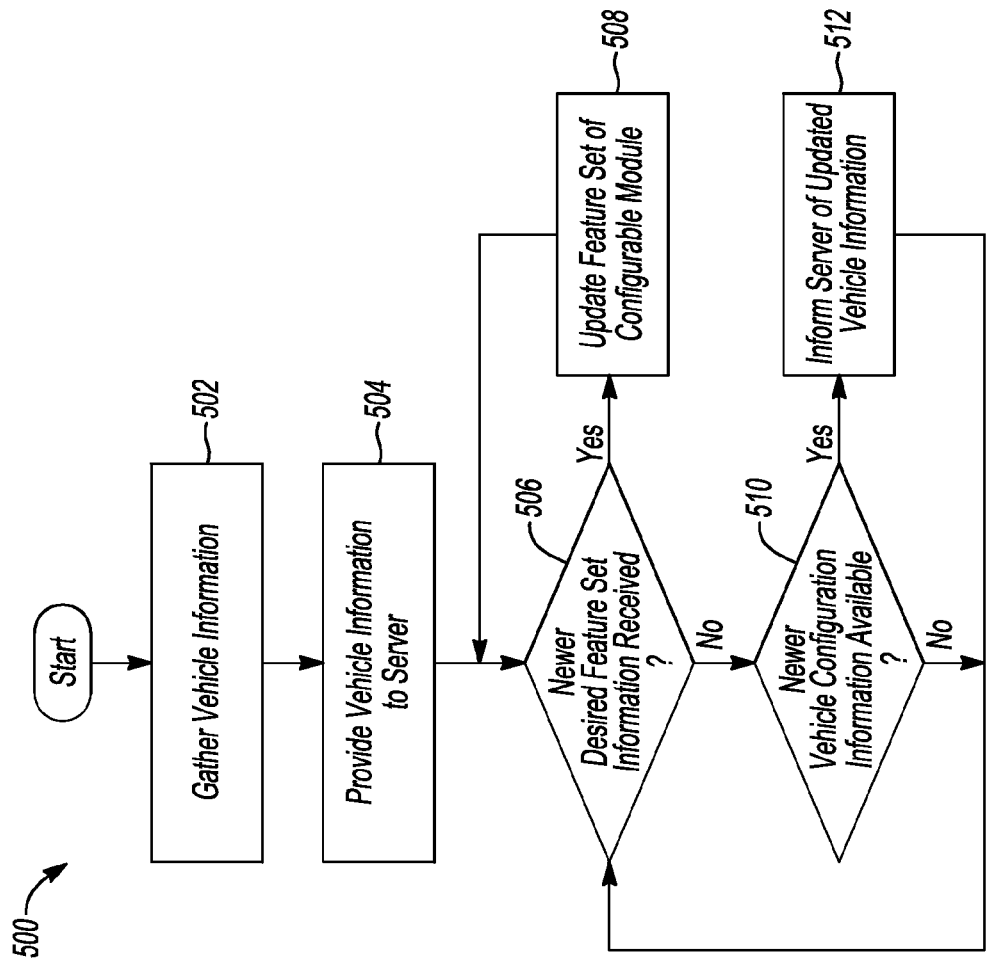
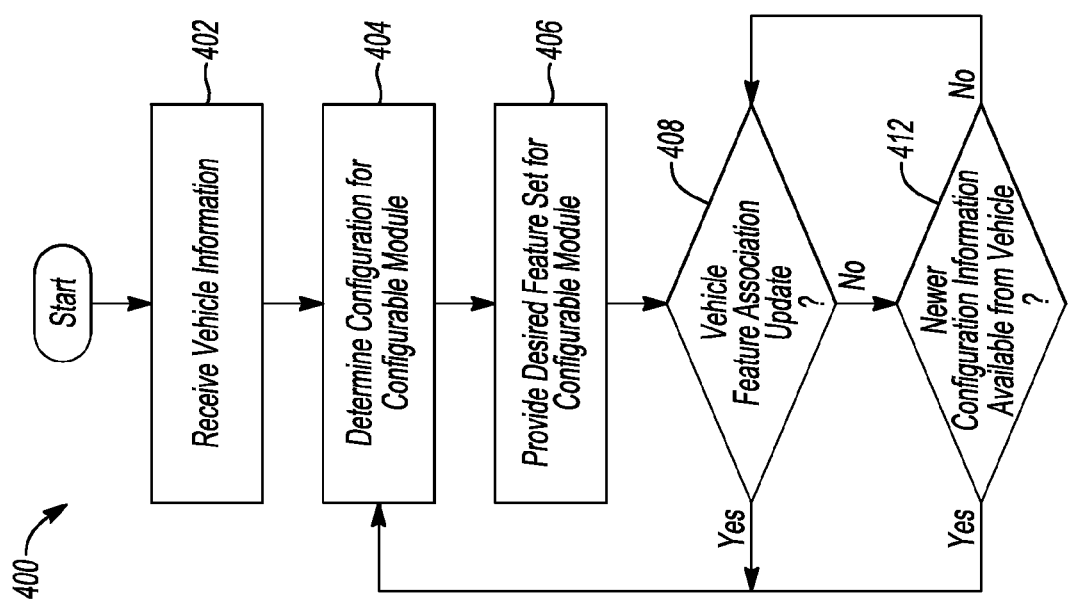

FLEXIBLE FEATURE DEPLOYMENT STRATEGY

TECHNICAL FIELD

The illustrative embodiments generally relate to a method and apparatus for updating a configuration of a module to support different features.

BACKGROUND

Part number complexity may introduce inefficiencies at supplier sites when parts are built, and at manufacturing facilities when parts are added to vehicles. Similar complexity may also exist for service parts. As one possibility, a part may have multiple part numbers to identify use of the part in different vehicle lines and model years. The complexity of these multiple part numbers may be compounded by having different part numbers for the same part in different regions of the world. In such a system, the complexity of part numbers increases exponentially as newer features are added. Managing complexity of parts globally may be critical for a business, as part complexity may have a direct impact on a company's bottom line.

SUMMARY

A method may include providing, from a vehicle to a server, a vehicle identifier and vehicle build configuration information; and updating, based on a notification, received by the vehicle from the server in a vehicle-identifier-associated topic tree message topic, a configurable vehicle module feature set configuration, supporting a plurality of features.

A vehicle may include a configurable module supporting a plurality of features and configured to provide, from the vehicle to a server, a vehicle identifier and vehicle build configuration information; and update, based on a notification, received by the vehicle from the server in a vehicle-identifier-associated topic tree message topic, a configurable vehicle module feature set configuration, supporting a plurality of features.

A system may include a service delivery network configured to receive, from a vehicle, a vehicle identifier of the vehicle and vehicle build configuration information, determine a feature set configuration of a configurable module of the vehicle based on the vehicle information and vehicle feature associations retrieved from a vehicle data source, and provide, in a message topic of a topic tree associated with the vehicle identifier to which the vehicle is subscribed, a notification to configure the configurable module.

BRIEF DESCRIPTION OF THE DRAWINGS

FIG. 4 illustrates an exemplary process for providing configuration updates from a service delivery network to configure a configurable module of a vehicle.

FIG. 5 illustrates an exemplary process for the receiving configuration updates from a service delivery network to configure a configurable module of a vehicle.

DETAILED DESCRIPTION

Figure 1:
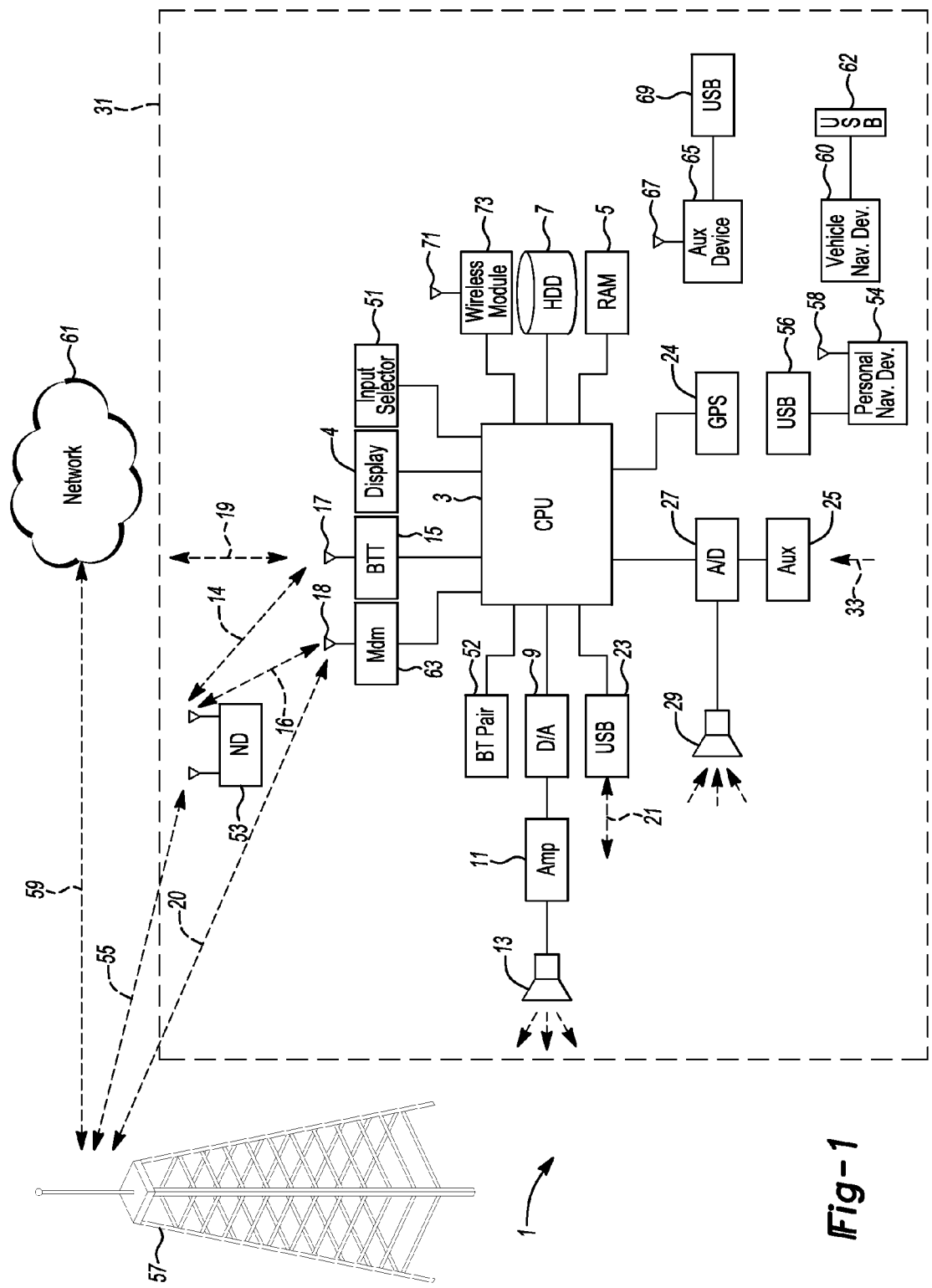
FIG. 1 illustrates an example block topology for a vehicle-based computing system for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To allow a system to enable a set of features that are supported by a build configuration of a vehicle, features of the vehicle may be tied to part numbers of modules included in the vehicle. In such approaches, as the build configuration depends on part number, individual vehicles may lack flexibility to select which features to enable or disable. Moreover, due to differences in part number for the same part across regions, vehicles, and model years, such approaches do not allow one part to be shipped where needed and to have a set of features enabled, disabled, and configured based on individual needs for the vehicle.

To address these and other issues with part number and feature complexity, a configurable module having a plurality of features may be deployed from a manufacturing facility. The plurality of features may allow the configurable module to operate in a variety of regions, vehicles, and model years. When shipped from the supplier manufacturing facility, the configurable module may not be associated with a specific part number tied to a vehicle line, model year or region of the world for which the configurable module may be destined. Rather, the configurable module as shipped may be configured to make a connection to a service delivery network to provide build configuration information, and to receive feature configuration information to use to configure the configurable module.

For example, a vehicle may be configured to determine a build configuration of the vehicle (e.g., as built upon end-of-line (EOL) configuration at the vehicle manufacturing facility), and may be further configured to send the build configuration and vehicle-identifying information (e.g., VIN) to a service delivery network of a system. Based on the build configuration and other vehicle factors (e.g., vehicle owner, geographic region associated with the vehicle, software version of a vehicle component of the vehicle, etc.), the service delivery network may be configured to enable, disable, or configure features of the feature set of the configurable module by providing commands from the service delivery network to the vehicle. As a specific example, one fleet owner may prefer GPS data from the configurable module every 2 minutes, while another fleet owner may prefer GPS data from the configurable module every 10 minutes. As another possibility, the service delivery network may be configured to enable, disable, or configure features of the configurable module after initial configuration, such as enabling a feature when a vehicle subscribes to the feature, and disabling the feature when the vehicle unsubscribes from the feature.

To perform the configuration of the feature set of the configurable module, the service delivery network and vehicle may utilize a publish/subscribe model to publish software updates that can be consumed by vehicle subscribers. The publish/subscribe model may utilize topics, which are named logical channels, through which publishers may send messages and subscribers may receive messages. In some cases, a vehicle may be a publisher and may send vehicle alerts to a service delivery network, respond to commands from the service delivery network, or notify the service delivery network of vehicle connectivity status. In other cases, a vehicle may be a subscriber and may receive control messages or software updates from a service delivery network. For example, a publisher of configuration updates may provide a configuration file in a topic node corresponding to a vehicle to be updated.

The configurable module may utilize a received configuration file or other received configuration messages to configure the feature set of the configurable module, thereby allowing different features supported by the configurable module to be enabled, disabled and customized according to end user requirements. Moreover, as the approach is not tied to a particular configurable module version or feature set, as newer features are added by software updates to the configurable module, those newer features may also be configured by the service delivery network.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11 g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
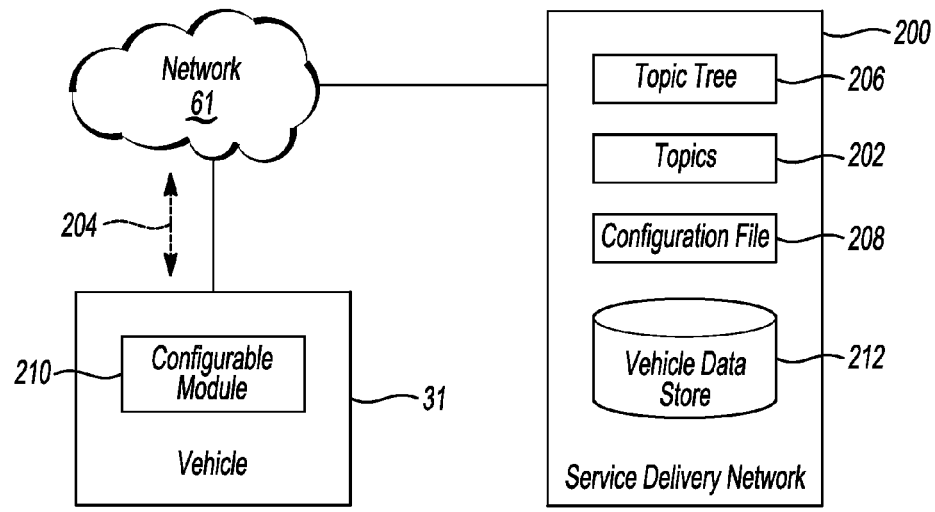
FIG. 2 illustrates an exemplary service delivery network in communication over the network with a vehicle having a configurable module.

FIG. 2 illustrates an exemplary service delivery network 200 in communication over the network 61 with a vehicle 31 having a configurable module 210. When a vehicle 31 is assembled, the vehicle 31 may include various hardware and software components. Upon or after assembly, a VCS 1 of the vehicle 31 may be configured to query for existence and version information for at least a portion of these hardware and software components of the vehicle 31. Using the queried information and additional information identifying the specific vehicle 31 (e.g., VIN information published on the CAN bus, subscriber identity module (SIM) information of the modem 63 such as international mobile station equipment identity (IMEI)), the VCS 1 may communicate via the network 61 to establish an account with the service delivery network 200. The service delivery network 200 may receive these communications from the vehicles 31, and may maintain a data store of the hardware configurations and software (e.g., firmware) versions linked to identifiers of the vehicles 31.

The service delivery network 200 may additionally provide publish/subscribe messaging functionality for communication between the service delivery network 200 and the vehicles 31. The publish/subscribe model may utilize one or more topics 202, where topics 202 are named logical channels through which publishers may send messages 204 and subscribers may receive messages 204. Rather than receiving all the messages 204, subscribers to the topics 202 receive the messages 204 published to the topics 202 to which they subscribe, and all subscribers to a topic 202 will receive substantially the same topic messages 204. A publisher of the messages 204 may be responsible for providing messages 204 to the topics 202 that are consistent with the topic 202.

In some cases, a vehicle 31 may be a publisher and may send vehicle alerts to a topic 202 of the service delivery network 200, respond to messages 204 from the service delivery network 200, or notify the service delivery network 200 of vehicle 31 connectivity status to the network 61. In other cases, a vehicle 31 may be a subscriber and may receive control messages 204 or other information from a service delivery network 200.

To facilitate the publishing of messages 204 to appropriate topics 202, the topics 202 may be arranged into a topic tree 206. The topic tree 206 may be defined by the service delivery network 200 to provide a structure of the topics 202 and sub-topics 202 that are used in sending messages 204 between the vehicles 31 and the service delivery network 200.

The configurable module 210 may be one component of the vehicle 31 that may be configured according to the publish/subscribe model. The configurable module 210 may support a plurality of features that allow the configurable module 210 to operate in a variety of regions, vehicles, and model years. In some cases, the configurable module 210 may be one aspect of the VCS 1, while in other cases the configurable module 210 may be a separate component from the VCS 1. In yet further cases, a vehicle 31 may include multiple configurable modules 210, where each of the multiple configurable modules 210 may be configured as described herein.

Based on the vehicle 31 configuration (e.g., as built upon end-of-line (EOL) configuration at the vehicle manufacturing facility, as modified post build, etc.) and other vehicle factors (e.g., vehicle 31 owner, a geographic region associated with the vehicle 31, and a software version of a vehicle component of the vehicle 31), the service delivery network 200 may be configured to enable, disable, or configure features of the configurable module 210 by providing messages 204 or configuration files 208 from the service delivery network 200 to topics 202 to which the vehicle 31 is subscribed. A message 204 may be used, for example, to adjust a setting of the configurable module 210, such as to enable or disable a portion of functionality, or to configure a parameter of a portion of functionality. A configuration file 208 may include information to configure multiple portions of functionality of the configurable module 210. In some cases, a configuration file 208 may include information useful to allow the configurable module 210 to enable, disable, or configure all or substantially all of the functionality of the configurable module 210.

The vehicle data store 212 may be configured to maintain vehicle 31 feature associations regarding aspects of the configuration of the vehicles 31. As one possibility, the vehicle data store 212 may be configured to maintain information regarding which vehicles 31 are associated with what owners or customers. For example, the vehicle data store 212 may maintain an association of vehicle identifiers (e.g., VINs) of vehicles 31 that are owned by or otherwise part of a fleet of vehicles as being associated with that fleet. The vehicle data store 212 may further maintain fleet-specific settings associated with the fleet of vehicles 31. As another possibility, the vehicle data store 212 may maintain an association of vehicle identifiers (e.g., VINs) of vehicles 31 that are subscribed to various vehicle 31 features. For instance, the vehicle data store 212 may maintain an association of those vehicles 31 that are subscribed to a turn-by-turn directions service. As yet a further possibility, the vehicle data store 212 may be configured to maintain information regarding the current vehicle configuration information provided to the vehicles 31. This information may be used, for example, to determine whether various types of changes may requires updates to the configuration of a vehicle 31.

Thus, the configurable module 210 may be configured to have a set of features enabled, disabled, added, deleted, and/or configured based on the needs for the vehicle 31, allowing a single part number of configurable module 210 to be utilized across regions, vehicles 31, and model years. The configurable module 210 may additionally be updated based on changed needs for the vehicle 31. For instance, the service delivery network 200 may be configured to enable a feature when the vehicle 31 is subscribed to the feature, and disable the feature when the vehicle 31 is unsubscribed from the feature.

Figure 3:
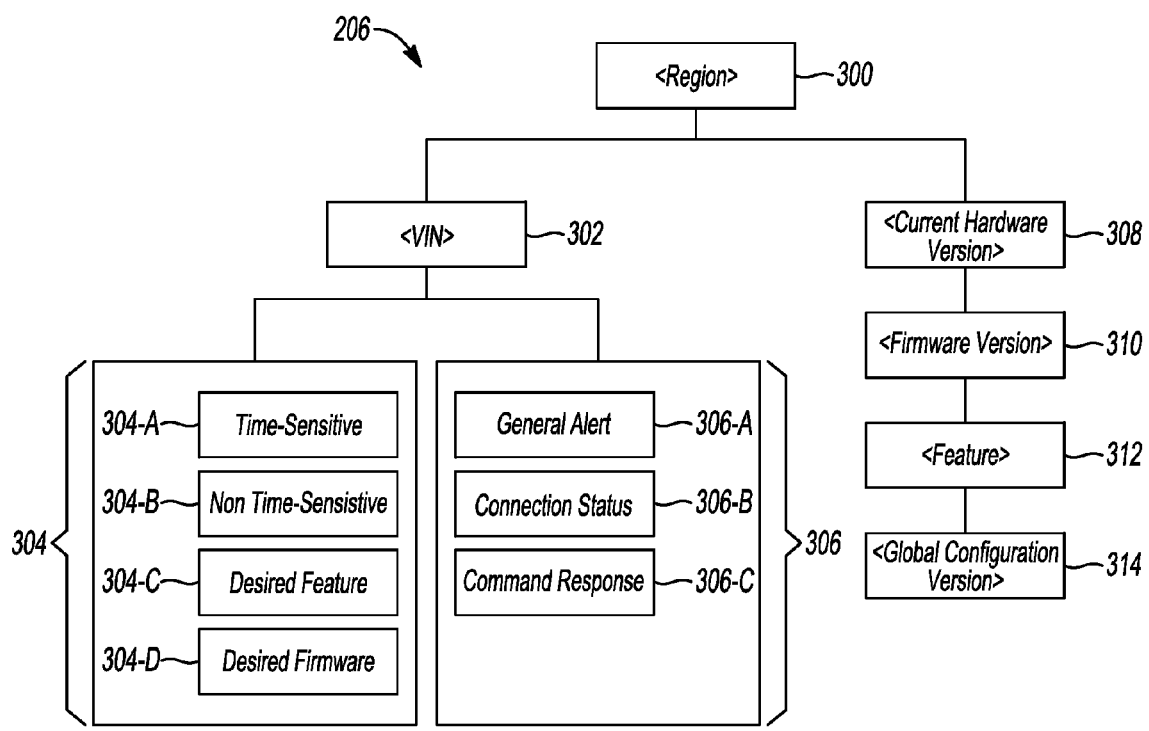
FIG. 3 illustrates an exemplary topic tree for use in updating software versions or configurations of a vehicle-based computing system.

FIG. 3 illustrates an exemplary topic tree 206 for use in updating software versions or configurations of a VCS 1. The topic tree 206 may be used, for example, to allow the service delivery network 200 to define a topic 202 structure for performing vehicle 31 software and configurations updates. A VCS 1, such as a telematics unit of a vehicle 31, may subscribe to nodes of the topic tree 206 that correspond to the installed region, software/firmware version, features, and configuration file 208 version of the vehicle 31. It should be noted that the particular layout of the exemplary topic tree 206 is for purpose of illustration only, and other layouts of topic tree 206 may be used. For example, other topic trees 206 may be used by the service delivery network 200 that have more, fewer or different levels of categorization.

Referring to the topic tree 206 of FIG. 3, a region node 300 of the topic tree 206 may indicate a region for which the sub-topic 202 nodes under the region node 300 may relate. In some cases, the region nodes 300 may represent different regional market areas in which vehicles 31 may be sold, such as North America, Europe, and Asia Pacific. In other examples the region nodes 300 may relate to other geographical areas, such as countries, states, postal codes, and telephone area codes, as some other examples. By segmenting the topic tree 206 by region, the service delivery network 200 may accordingly publish different information for vehicles 31 associated with different regions.

Under each region node 300, the topic tree 206 may include one or more vehicle-specific nodes 302, where each vehicle-specific node 302 relates to a vehicle 31 associated with the parent regional node 300. As one possibility, the service delivery network 200 may create vehicle-specific nodes 302 for vehicles 31 according to VIN or other unique identifier of vehicles 31 that register with the service delivery network 200 as belonging to the particular region. Sub-nodes to the vehicle-specific nodes 302 may be used to further organize topics 202 configured for communication to and from the individual vehicles 31.

For instance, under the vehicle-specific nodes 302, the topic tree 206 may further include one or more vehicle topic nodes 304 for communication to the specific vehicles 31. A vehicle 31 may subscribe to the vehicle topic node 304 that correspond to the VIN or other unique identifier of the vehicle 31, so that the vehicle 31 may be able to receive messages 204 in topics 202 that specifically relate to the vehicle 31 itself.

As one example, a vehicle 31 may subscribe to a time-sensitive update vehicle topic node 304-A for receiving messages 204 for the particular vehicles 31 that are of a time-sensitive nature. Due to their time-sensitive nature, messages 204 posted to the time-sensitive update vehicle topic node 304-A may time out and be removed from the topic 202 if they are not received by the vehicle 31 within an amount of time (e.g., specified by the message 204, common to all time-sensitive messages 204, etc.). As another example, a vehicle 31 may subscribe to a non-time-sensitive vehicle topic node 304-B for receiving messages 204 for the particular vehicles 31 that not of a time-sensitive nature. Updates, such as calendar updates, may be posted to the non-time-sensitive vehicle topic node 304-B, and may remain in the topic 202 until received by the subscribed vehicle 31. As a further example, a vehicle 31 may subscribe to a feature update vehicle topic node 304-C for receiving messages 204 in a topic 202 directed to particular vehicles 31 and relating to updates to the features 31 of the vehicle 31. In this content, a feature may refer to a grouping of configuration parameters applicable to the specified vehicle 31 included in the topic tree 206. A feature may, for example, represent settings to implement an available connected service (e.g., MY FORD MOBILE) or a customer-specific collection of settings (e.g., a suite of features requested to be enabled and/or disabled for use by a particular fleet purchaser). As yet a further example, a vehicle 31 may subscribe to a firmware update vehicle topic node 304-D for receiving messages 204 in a topic 202 directed to particular vehicles 31 and relating to updates to the firmware of the vehicle 31.

The vehicle-specific nodes 302 the topic tree 206 may further include one or more vehicle topic node 306 for communication from the specific vehicles 31. For example, a general alert topic node 306-A may be used by a vehicle 31 to publish messages 204 such as indications of low fuel, erratic driving by the vehicle 31, or periodic current vehicle 31 GPS locations. As another example, a connection status topic node 306-B may be used by a vehicle 31 to publish messages 204 such as the connection status of the vehicle 31 (e.g., whether the vehicle 31 was disconnected and then reconnected to the network 61). As yet a further example, a command response alert topic node 306-C may be used by a vehicle 31 to publish messages 204 such as indications of success or failure of actions requested by the service delivery network 200.

Moreover, also under each region node 300 the topic tree 206 may include one or more hardware version topic nodes 308, where each hardware version topic node 308 relates to an installed vehicle 31 hardware version that may be shared by multiple vehicles 31 (e.g., a version of the VCS 1 hardware). These hardware version topic nodes 308 and sub-topic nodes may accordingly be used to reference the vehicles 31 according to hardware version, not according to individual vehicle 31.

Under each hardware version topic node 308, the topic tree 206 may include one or more firmware version nodes 310. Each firmware version node 310 may organize nodes of the topic tree 206 associated with a firmware version that may be installed on the parent vehicle 31 hardware for a particular region.

The firmware version node 310 may further include feature nodes 312 organizing nodes of the topic tree 206 associated with a particular feature. As mentioned above, a feature may represent settings to implement an available connected service or a customer-specific collection of settings. Thus, a firmware version (e.g., a firmware version of the configurable module 210) may support multiple different features, where different portions of functionality of the firmware are engaged or disengaged for the various features.

The feature nodes 312 may further include configuration version nodes 314, each representing a topic 202 related to a version of a configuration file 208 for the associated feature, firmware version, hardware version, and region. The configuration files 208 may include setting and other information related to the parent features that they configure (e.g., for the version of firmware installed on the version of hardware for the particular region). Because settings and other options may change from version to version, the configuration files 208 may also include a version number of the firmware for which they are compatible.

A vehicle 31 may subscribe to topics of 202 the topic tree 206 that relate to the configuration of the vehicle 31. As one example, a vehicle may subscribe to a vehicle topic node 304 corresponding to the VIN of the vehicle 31, to receive any updates targeting the specific vehicle 31. As another example, a VCS 1 of a vehicle 31 may subscribe to a configuration version node 314 of the topic tree 206, to receive configuration or other updates corresponding to the installed region, hardware version, firmware version, feature, and global configuration version of the vehicle 31. The subscribed vehicle 31 may check or otherwise be informed of messages 204 published to the subscribed topics 202.

The service delivery network 200 may publish messages 204 into topics 202 of the topic tree 206 for which updates are to be performed. As one possibility, the service delivery network 200 may publish a message 204 into a vehicle topic node 304 to cause a particular vehicle 31 to be informed that a software or configuration update should be performed for the vehicle 31. As another possibility, the service delivery network 200 may publish a message 204 into a configuration version node 314 to cause any subscribed vehicles 31 having a particular region, hardware version, firmware version, feature, and global configuration version to perform a software or configuration update.

In some examples, an update may be indicated by a service delivery network 200 publishing a new configuration file 208 in the subscribed topic 202 as the message 204, where the new configuration file 208 may be associated with an updated version of the software or firmware. A vehicle 31 receiving the configuration file 208 may identify the version of the configuration file 208, and may set a desired software or firmware version for the vehicle 31 to be that of the version of the configuration file 208. Thus, upon becoming aware of an update notification message 204 in a subscribed node of the topic tree 206, the vehicle 31 may identify to upgrade its software version to the version specified by the notification.

The vehicle 31 may further utilize the topic tree 206 to provide updates messages 204 to the service delivery network 200 with respect to the status of the software update. For example, the vehicle 31 may publish alert messages 204 in an alert vehicle topic node 304 indicative of whether or not the software update was successful, and also to report the new installed version of the vehicle 31 software to the service delivery network 200. Accordingly, by using the topic tree 206, the service delivery network 200 may be able to request updates for individual vehicles 31 or for vehicles 31 having specific configurations.

FIG. 4 illustrates an exemplary process 400 for providing configuration updates from a service delivery network 200 to configure a configurable module 210 of a vehicle 31. The process 400 may be performed, for example, by a service delivery network 200 in communication with a VCS 1 of a vehicle 31 over a network 61.

At block 402, the service delivery network 200 receives vehicle 31 information. For example, when a vehicle 31 is assembled, the vehicle 31 may include various hardware and software components. Upon or after assembly, a VCS 1 of the vehicle 31 may be configured to query for existence and version information for at least a portion of these hardware and software components of the vehicle 31. The service delivery network 200 may be configured to receive the end-of-line (EOL) configuration of the vehicle 31 as built at a vehicle manufacturing facility from the VCS 1 of the vehicle 31 that was built. The end-of-line configuration may include information such as a model of the vehicle 31, a year of the vehicle 31, options included in the vehicle 31 and a region in which the vehicle 31 is built or intended for sale.

At block 404, the service delivery network 200 determines a configuration for the configurable module 210 of the vehicle 31. As one possibility, the service delivery network 200 may be configured to determine whether to enable or disable features of the configurable module 210 based on the supported functionality of the modules included in the vehicle 31 as built. As another possibility, the service delivery network 200 may be configured to determine particular feature settings for the configurable module 210 based on the vehicle data store 212 feature associations of vehicle 31 identifiers and associated customers or desired configuration parameters. For instance, by querying the vehicle data store 212 for the vehicle identifier of the vehicle 31, the service delivery network 200 may identify that the vehicle 31 is a member of a customer fleet requiring a customer-specific feature setting (e.g., one fleet owner may prefer GPS data from the vehicle 31 every 2 minutes, while another fleet owner may prefer the GPS data from the vehicle 31 every 10 minutes). These customer-specific feature settings may be included in a determined configuration for the configurable module 210.

At block 406, the service delivery network 200 provides a notification to configure the desired feature set of the configurable module 210. For example, the service delivery network 200 may publish one or more messages 204 into a vehicle topic node 304 to which the vehicle 31 is subscribed. The message 204 may include, as some examples, a configuration file 208 or a set of messages 204 to update particular configuration settings or information.

At decision point 408, the service delivery network 200 determines whether the vehicle data store 212 feature associations for a vehicle 31 has been updated. For example, the service delivery network 200 may identify whether the vehicle data store 212 has received any messages or other updates to a subscription status of the vehicles 31 to various features (e.g., vehicles 31 becoming subscribed to services, vehicles 31 becoming unsubscribed from services). As another example, the service delivery network 200 may identify whether the vehicle data store 212 has received any messages or other updates to the association of vehicles 31 with various customers or fleets (e.g., vehicles 31 changing ownership). As yet another example, the service delivery network 200 may identify whether customer-specific (e.g., fleet-specific) requirements have changed, such as a change in a number of minutes between GPS location updates provided by a vehicle 31. If information for a vehicle 31 has been updated, control passes to block 404 to inform the vehicle 31 of any configuration updates. Otherwise, control passes to decision point 412.

At decision point 410, the service delivery network 200 determines whether the vehicle 31 information has been updated. For example, the service delivery network 200 may identify whether the VCS 1 of the vehicle 31 has provided updated vehicle configuration information in a message 204 published to a topic 202 of the topic tree 206 corresponding to the vehicle 31 (e.g., in the general alert topic node 306-A or another topic node 306 associated with the specific vehicle 31). If new information has been provided, control passes to block 404 to inform the vehicle 31 of any configuration updates. Otherwise, control passes to decision point 408.

FIG. 5 illustrates an exemplary process 500 for the receiving configuration updates from a service delivery network 200 to configure a configurable module 210 of a vehicle 31. The process 500 may be performed, for example, by a VCS 1 of a vehicle 31 in communication with a service delivery network 200 over a network 61.

At block 502, the vehicle 31 gathers a configuration of the vehicle 31. For example, the VCS 1 of the vehicle 31 may determine the end-of-line (EOL) configuration of the vehicle 31 as built at a vehicle manufacturing facility. When a vehicle 31 is assembled, the vehicle 31 may include various hardware and software components. Upon or after assembly, a VCS 1 of the vehicle 31 may be configured to query for existence and version information for at least a portion of these hardware and software components of the vehicle 31.

At block 504, the vehicle 31 provides the configuration of the vehicle 31 to the service delivery network 200. For example, the VCS 1 may communicate via the network 61 to establish an account with the service delivery network 200 using the queried information and additional information identifying the specific vehicle 31 (e.g., VIN information published on the CAN bus, subscriber identity module (SIM) information of the modem 63 such as international mobile station equipment identity (IMEI)). The service delivery network 200 may receive these communications from the vehicles 31, and may maintain a data store of the hardware configurations and software (e.g., firmware) versions linked to identifiers of the vehicles 31. Based on the vehicle configuration information, the service delivery network 200 may subscribe the vehicle 31 to topics 202 of the topic tree 206 that correspond to the information identifying the specific vehicle 31, thereby providing the service delivery network 200 with one or more vehicle topic nodes 304 that may be used to configure the particular vehicle 31.

At decision point 506, the vehicle 31 determines whether a notification of a feature set update from the service delivery network 200 is pending. For example, the service delivery network 200 may publish a message 204 into a vehicle topic node 304 including a configuration file 208 or other updated configuration update information. If the vehicle 31 determines that a configuration update is pending, control passes to block 508. Otherwise, control passes to decision point 510.

At block 508, the vehicle 31 updates the configuration of the feature set of the configurable module 210. For example, the service delivery network 200 may publish a message 204 into a vehicle topic node 304 including a configuration file 208 or other configuration update information. The vehicle 31 may perform configuration of the configurable module 210 in accordance with the message 204 to enable, disable or configure features of the configurable module 210. After block 508, control passes to decision point 506.

At decision point 510, the vehicle 31 determines whether a notification of a newer vehicle 31 configuration should be provided from the vehicle 31 to the service delivery network 200. For example, the VCS 1 of the vehicle 31 may determine the vehicle configuration periodically (e.g., daily, weekly), upon vehicle key-on, when explicitly requested by an operator of the vehicle 31, or when requested by the service delivery network 200 (e.g., by sending a request to a topic 202 to which the vehicle 31 is subscribed). If the vehicle 31 determines that the vehicle 31 configuration has updated, control passes to block 512. Otherwise, control passes to decision point 506.

At block 512, the vehicle 31 provides a notification of the vehicle 31 configuration update to the service delivery network 200. For example, the VCS 1 of the vehicle 31 may provide updated vehicle configuration information the service delivery network 200 in a message 204 published to a topic 202 of the topic tree 206 corresponding to the vehicle 31 (e.g., in the general alert topic node 306-A or another topic node 306 associated with the specific vehicle 31). After block 512, control passes to decision point 506 to potentially receive any applicable configuration updates determined to by the service delivery network 200.

Thus, based on the vehicle 31 configuration and other vehicle 31 factors, the service delivery network 200 may be configured to enable, disable, or configure features of a configurable module 210 of a vehicle 31. The configurable module 210 may allow different features to be enabled, disabled or customized according to the requirements of the vehicle 31 owner and the capabilities of the vehicle 31. Moreover, due to the configurable nature of the configurable module 210, the configurable module 210 may allow for the avoidance of complicated issues with respect to the management of different part numbers for the same module across regions, vehicles, and model years.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
subscribing a vehicle of a fleet to a message topic of a topic tree on a server, the message topic including notifications specific to a vehicle identifier of the vehicle; and
updating, based on a notification received by the vehicle from the message topic, published due to a change in fleet-specific settings triggered responsive to receipt to a data store of an update message indicating a change in association of the vehicle from association with the fleet to association with another fleet, a feature set configuration specific to the other fleet for a configurable module.

2. The method of claim 1, further comprising:
gathering vehicle build configuration information by the vehicle; and
sending the vehicle build configuration information to the server.

3. The method of claim 1, wherein the vehicle identifier includes at least one of a vehicle identification number (VIN) of the vehicle or subscriber identity module (SIM) information of a modem of the vehicle, and further comprising subscribing the vehicle to the message topic of the topic tree according to the vehicle identifier.

4. The method of claim 1, further comprising adjusting the feature set configuration of the configurable module according to a change in at least one of (i) an owner of the vehicle, or (ii) a geographic region associated with the vehicle.

5. The method of claim 4, wherein adjusting the feature set configuration of the configurable module includes at least one of (i) enabling a feature supported by the configurable module, (ii) disabling a feature supported by the configurable module, or (iii) adjusting a setting of a feature supported by the configurable module.

6. The method of claim 1, further comprising at least one of (i) enabling a feature supported by the configurable module when the vehicle is subscribed to the feature, and (ii) disabling a feature supported by the configurable module when the vehicle is unsubscribed to the feature.

7. The method of claim 1, further comprising assigning a default feature set configuration to the configurable module disabling at least one feature of the configurable module until the configurable module receives the notification in the message topic.

8. The method of claim 1, wherein the change in fleet-specific settings includes a change in a number of minutes between GPS location updates provided by the vehicle.

9. A system comprising:
a configurable module of a vehicle, executing firmware supporting a plurality of features; and
a computing system of the vehicle in communication with the configurable module and a remote server, programmed to send a vehicle identifier to the server; and
update the configurable module, based on a notification from the server published to a topic of a topic tree corresponding to the vehicle identifier due to a change in vehicle fleet association or fleet-specific settings, the notification including a feature setting specific to a fleet with which the vehicle is identified as a member by the vehicle identifier,
wherein the change in fleet-specific settings is triggered responsive to receipt to a data store of an update message indicating a change in association of the vehicle from association with the fleet to association with another fleet, and the change in fleet association is triggered responsive to an update to the data store including records associating vehicles with fleets of which the vehicles are members.

10. The system of claim 9, the computing system further programmed to:
gather vehicle build configuration information; and
send the vehicle build configuration information to the server.

11. The system of claim 9, the configurable module further programmed to adjust the feature set configuration of the configurable module according to at least one of (i) an owner of the vehicle, (ii) a geographic region associated with the vehicle, and (iii) a software version of a vehicle component of the vehicle.

12. The system of claim 11, wherein adjusting the feature set configuration of the configurable module includes at least one of (i) enabling a feature supported by the configurable module, (ii) disabling a feature supported by the configurable module, and (iii) adjusting a setting of a feature supported by the configurable module.

13. The system of claim 9, the configurable module further programmed to at least one of (i) enable a feature supported by the configurable module when the vehicle is subscribed to the feature, and (ii) disable a feature supported by the configurable module when the vehicle is unsubscribed to the feature.

14. The system of claim 9, the configurable module further programmed to utilize a default feature set configuration disabling at least one feature of the configurable module until the configurable module receives the notification.

15. A system comprising:
vehicle feature associations linking vehicle identifiers of vehicles with fleets with which the vehicles are members; and
a server programmed to
receive, from a vehicle, a vehicle identifier of the vehicle and vehicle build configuration information,
identify an update in a vehicle data store of a feature associations of the vehicle due to a change in vehicle fleet association or fleet-specific settings,
determine a feature set configuration of a configurable module of the vehicle based on the vehicle identifier, the vehicle build configuration information, the update, and the vehicle feature associations, the feature set configuration including at least one setting specific to a vehicle fleet of which the server determines the vehicle to be a member using the vehicle identifier and the vehicle feature associations, and
provide, in a message topic of a topic tree associated with the vehicle identifier to which the vehicle is subscribed, a notification to configure the configurable module according to the feature set configuration,
wherein the change in fleet-specific settings is triggered responsive to receipt to a data store of an update message indicating a change in association of the vehicle from association with the fleet to association with another fleet, and the change in fleet association is triggered responsive to an update to the data store including records associating vehicles with fleets of which the vehicles are members.

16. The system of claim 15, wherein the vehicle identifier includes at least one of a vehicle identification number (VIN) of the vehicle and subscriber identity module (SIM) information of a modem of the vehicle, and the server is further programmed to perform operations comprising subscribing the vehicle to the message topic of the topic tree according to the vehicle identifier.

17. The system of claim 15, wherein the vehicle feature associations include at least one of (i) an owner of the vehicle, (ii) a geographic region associated with the vehicle, and (iii) a software version of a vehicle component of the vehicle.

18. The system of claim 17, wherein adjusting the feature set configuration of the configurable module includes at least one of (i) enabling a feature supported by the configurable module, (ii) disabling a feature supported by the configurable module, and (iii) adjusting a setting of a feature supported by the configurable module.

19. The system of claim 15, wherein the notification is configured to cause the vehicle to perform operations comprising performing at least one of (i) enabling a feature supported by the configurable module when the vehicle is subscribed to the feature according to the vehicle feature associations, and (ii) disabling a feature supported by the configurable module when the vehicle is unsubscribed to the feature according to the vehicle feature associations.

20. The system of claim 15, wherein the notification includes a configuration file specifying information to configure multiple portions of functionality of the configurable module.

21. The system of claim 15, further comprising a configurable module configured to:
provide, from the vehicle to the server, the vehicle identifier and the vehicle build configuration information; and
update, based on the notification, the configuration of the configurable module.

22. A computer-implemented method comprising:
subscribing a vehicle of a fleet to a server-hosted message topic of a topic tree including notifications specific to the vehicle; and
updating, based on a notification received by the vehicle from the message topic, published due to a change in fleet association from the fleet to another fleet triggered by updating records of a fleet association database, a feature set configuration specific to the other fleet for a configurable module.

23. The method of claim 22, further comprising:
gathering vehicle build configuration information by the vehicle; and
sending the vehicle build configuration information to the server.

24. The method of claim 22, wherein the message topic is associated with the vehicle by vehicle identifier, wherein the vehicle identifier includes at least one of a vehicle identification number (VIN) of the vehicle or subscriber identity module (SIM) information of a modem of the vehicle, and further comprising subscribing the vehicle to the message topic of the topic tree according to the vehicle identifier.

25. The method of claim 22, further comprising adjusting the feature set configuration of the configurable module according to a change in at least one of (i) an owner of the vehicle, or (ii) a geographic region associated with the vehicle.

26. The method of claim 25, wherein adjusting the feature set configuration of the configurable module includes at least one of (i) enabling a feature supported by the configurable module, (ii) disabling a feature supported by the configurable module, or (iii) adjusting a setting of a feature supported by the configurable module.

27. The method of claim 22, further comprising at least one of (i) enabling a feature supported by the configurable module when the vehicle is subscribed to the feature, and (ii) disabling a feature supported by the configurable module when the vehicle is unsubscribed to the feature.

28. The method of claim 22, further comprising assigning a default feature set configuration to the configurable module disabling at least one feature of the configurable module until the configurable module receives the notification in the message topic.

29. The method of claim 22, wherein the other fleet requires the change in a number of minutes between GPS location updates to be applied to the vehicle as being a member the other fleet.

* * * * *